3,424,913
DATA SENSING APPARATUS INCLUDING MULTIPLEX SENSING
Karl O. H. Hesse, Stewartville, Minn., assignor to International Business Machines Corporation, Armonk, N.Y., a corporation of New York
Filed May 27, 1966, Ser. No. 553,508
U.S. Cl. 250—219    7 Claims
Int. Cl. G01n 21/30

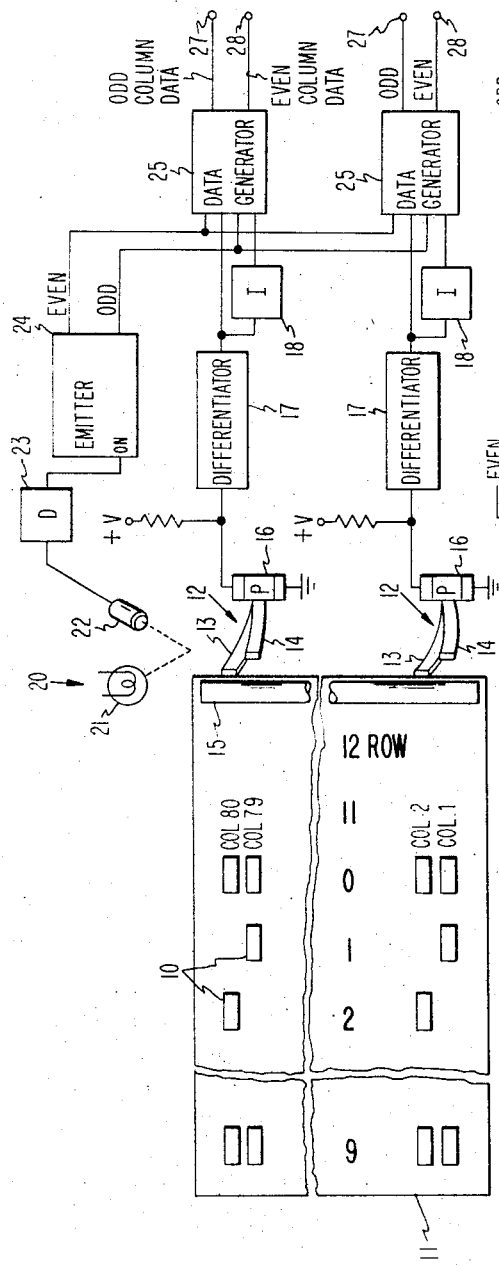
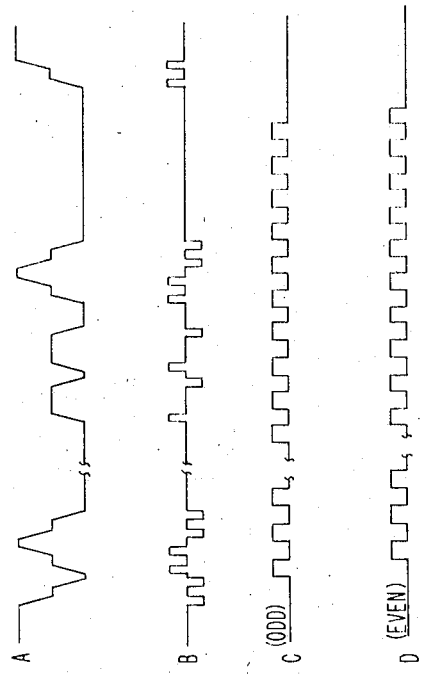
FIG.1
FIG.2
INVENTOR
KARL O.H. HESSE
BY Donald F Voss
ATTORNEY

United States Patent Office 3,424,913
Patented Jan. 28, 1969

ABSTRACT OF THE DISCLOSURE

A card reader is provided with a plurality of photodetectors each of which is capable of sensing data in more than one position. The output of each photodetector is received by a multiplexing circuit which produces separate output signals indicative of the presence of apertures in the separate data positions on the passing data card during each sensing cycle. The multiplexing circuit also allows for separate measurement of both the leading and trailing portions of each aperture.

---

This invention relates to apparatus for reading sensible data indications by sensing the leading and trailing portions of the data indication positions and sampling at each of these positions to determine if valid data exists and more particularly, to such apparatus including the sensing of more than one data indication position within a single sensing cycle by a common sensing device.

This invention provides for more reliable reading of data. It also permits data to be read at higher speeds and at lower costs.

By sensing both the leading and trailing portions of data indication positions and sampling at each of these positions to determine if a data indication is present, the possibility of reading small marks, pinholes, tears, smudges or oil spots as valid data is greatly reduced. The use of a common sensing device for more than one data position within a single sensing cycle provides a substantial cost savings. Further, the sensing of data indications is accomplished by detecting a change in output level rather than the magnitude of output level and hence, the apparatus is less sensitive to ambient conditions and higher speeds of reading. Also, in most instances, the output of the sensing device is connected to some type of signal amplifier and this type of sensing does not require matched gain amplifiers. The time rate of change of the output levels can be detected with differentiating amplifiers.

The invention finds particular utility in machines for reading punched record cards or for reading data in the form of marks. When reading punched record cards, a light transmission sensing system is particularly desirable. Whereas, when reading marks, a reflective light sensing system is desirable. Of course, the invention is equally applicable to other types of sensing systems, such as ones utilizing electrically conductive brushes.

The sampling pulses can be generated in many ways. The document itself can be used as a sample pulse generator. For example, pulses can be generated as the leading edge of the document passes relative to a plurality of sensors or sense elements connected to a single sensor where the plurality of sensors or sense elements are placed in the document path and spaced to correspond to the spacing of the data positions on the document. Another approach is to use the leading or trailing edge of the document to develop a sychronizing or gating pulse to control the passage of pulses from an emitter. The former approach is preferred because the pulses produced are locked to the document rather than an oscillator.

The number of different data positions which can be read by a common sensing device within a single sensing cycle is related to the amount of document skew and separation of the pulses identifying the leading and trailing portions of the data indications. Document skew, in view of data indication tolerances, may cause the leading and trailing portions of different data indications to be sensed simultaneously. If this occurs, it is not possible to distinguish between the data indications because the pulses will not be separated. In most instances, the document skew can be held within limits so as to permit the sensing of at least two separate data indications by a common sensing mechanism within a single sensing cycle.

Accordingly, a principal object of this invention is to provide improved apparatus for reading sensible data indications.

Another object of the invention is to provide apparatus for reading sensible data indications by sensing leading and trailing portions of the data indication positions and sampling at each of these portions and providing an output data signal only if a data indication is present at both portions of a data indication position.

Still another very important object of the invention is to provide apparatus for reading sensible data indications at more than one data indication position by a common sensing means within a single sensing cycle.

Yet another object of the invention is to provide apparatus which reads sensible data indications by detecting a change in output level rather than the magnitude of output level.

Another object of the invention is to provide apparatus for reading sensible data indications with a high degree of confidence that only valid data indications are read.

Another object of the invention is to provide apparatus for reading sensible data indications which is relatively inexpensive.

The foregoing and other objects, features and advantages of the invention will be apparent from the following more particular description of a preferred embodiment of the invention, as illustrated in the accompanying drawings.

In the drawings:

FIG. 1 is a schematic diagram illustrating the invention and also showing wave forms representing the total illumination level on the phototransistor, the differentiated output pulses, and the odd and even data sampling pulses; and, FIG. 2 is a detailed logic diagram of a typical data generator shown in block form in FIG. 1.

With reference to the drawings, and particularly to FIG. 1, the invention is illustrated by way of example as apparatus for sensing holes 10 in record card 11. Card 11 is a conventional record card having eighty columns and twelve rows of data indication positions. Card 11 is shown as being fed from right to left, between groups of sensing elements 12 and light source 15. Each group of sensing elements 12 includes elements 13 and 14. The sensing elements 13 and 14 have a length which is less than the length of a data indication position. Sensing elements 13 and 14 are longitudinally spaced from each other to be within a data indication position without overlapping each other. They are laterally spaced whereby sensing elements 13 and 14 are in position to sense the even and odd columns respectively. Sensing elements 14 are positioned to sense the odd columns prior to sensing elements 13 sensing the even columns. Of course, it should be recognized that this relationship could be reversed without changing the scope of the invention.

The sensing elements 13 and 14 of a group 12, in this particular example, are optical fibers grouped at one end to form a rectangle and conduct light passed by holes 10 at adjacent even and odd column positions to a common phototransistor 16. Thus, for each pair of odd and even columns, there is a single phototransistor 16. Within a single sensing cycle the leading portions of the odd data indication positions of the columns are sensed first by elements 14 and then the leading portions of the data indication positions of the even columns are sensed by elements 13. Thereafter, the trailing portions of the data indication positions of the odd columns are sensed by elements 14 and then the trailing portions of the data indication positions of the even columns are sensed by elements 13.

During the time the leading and trailing portions of the odd and even data indication positions are being sensed two series of sampling pulses are available. There are two sampling pulses of each series for each data indication position or sensing cycle. The sampling pulses can be synchronized to the data indication positions in many different ways. For example, document detector 20 consisting of light source 21 and photosensitive element 22 generates a signal upon detecting the leading edge of card 11. This pulse is applied to delay 23 which provides an output signal either at or slightly prior to the time the leading portions of the data indication positions of the odd columns reach the sensing elements 14. The output signal from 23 turns emitter 24 on. Emitter 24 generates twenty four odd and even pulses for each card 11. Emitter 24 can be a counter advanced by pulses from an oscillator or any other suitable device which can generate a predetermined number of pulses after having been turned on. Detector 20 could also have been positioned so as to detect the leading edge of card 11 just at or slightly prior to the time the leading portion of the data indication positions reach the sensing elements 14. This would eliminate the need for delay 23.

The sampling pulses can also be generated by a series of document detectors spaced apart to correspond to the spacing of the data indication positions. As the leading edge of the card is detected by each detector, four pulses are generated. These four pulses could be generated by turning on an oscillator with the signal from the document detector and then turn off the oscillator with the fourth pulse therefrom, as determined by a counter. Two of the four pulses would be used to sample the leading and trailing positions of the odd column data indication positions and two pulses would be used for sampling the leading and trailing positions of the even column data indication positions.

The odd and even sampling pulses from emitter 24 are applied to data generators 25 which have odd and even data column outputs 27 and 28. The output signals from phototransistors 16 are applied to differentiators 17 which provide output pulses only when there are changes in levels of the signals from the phototransistors 16. A decrease in level causes a negative signal to be generated, whereas an increase in level causes a positive signal to be generated. The output pulses from differentiators 17 are applied to data generators 25. As it will be seen shortly, data generators 25 are responsive to positive pulses only and hence the outputs of differentiators 17 are also applied to inverters 18 which have their outputs connected to the inputs of data generators 25.

The details of data generator 25 are shown in FIG. 2. The odd pulses from emitter 24 are applied to AND circuits 31 and 33 and the even pulses are applied to AND circuits 30 and 32. AND circuits 30 and 31 each have an input connected to the output of differentiator 17 and AND circuits 32 and 33 each have an input connected to the output of inverter 18. By this arrangement, when the associated differentiator 17 provides a positive output pulse at the time the leading portion of an odd data indication is being sensed, AND circuit 31 passes a signal to set latch 35. If the data indication is valid, then inverter 18 will provide a positive output signal at the time the trailing portion of the odd data indication position is being sensed and AND circuit 33 passes a signal for setting latch 37. With both latches 35 and 37 set, the input conditions to logical AND circuit 39 are satisfied, and it passes an odd column data signal. However, had only latch 35 or latch 37 been set, AND circuit 39 would not pass a signal. Thus, in order for a data indication to be valid, it is necessary for it to be present at both sampling times.

Latches 35 and 37 are reset when position 3 of counter 43 becomes active. Counter 43 is advanced by delayed odd and even emitter pulses passed by OR circuit 41 and delay 42. Delay 42 effectively determines the duration of the column data pulses. AND circuits 30 and 32 are connected to set latches 36 and 38 respectively. The set outputs of these latches are connected to AND circuit 40. When AND circuit 40 passes a signal, it is indicative of the presence of a data indication in an even column. Latches 36 and 38 have their reset inputs connected to position 4 of counter 43.

With reference again to FIG. 1, the output signal from phototransistor 16 corresponds to the amount of light directed thereupon. The information shown in columns 1 and 2 of card 11 is the same as shown for columns 79 and 80 and hence the output signal from either associated phototransistor 16 is the same. Wave form A represents the total light level on phototransistor 16 and is proportional to but inverted with respect to the signal output from phototransistor 16. As the leading edge of card 11 covers sensing elements 14, the light impinging on transistors 16 is reduced. The differentiators 17 generate negative pulses in response to this change, but data generators 25 do not develop any data pulses because no emitter pulses are available at this time. Then, as the leading edge of the card 11 covers sensing elements 13, the light on transistors 16 is further reduced to a minimum amount, i.e., to any ambient level. Again, differentiators 17 produce negative pulses but no data pulses are generated because no emitter pulses are available.

The first data indication positions, i.e., those in row 9, are shown as being punched in columns 1 and 2 and 79 and 80. Hence, as the hole in column 1, for example, uncovers its associated sensing element 14, the amount of light impinging upon associated phototransistor 16 increases and the associated differentiator 17 generates a positive pulse which is applied to AND circuits 30 and 31 and to inverter 18. By this time, emitter 24 has been turned on and an add column pulse is available. AND circuits 31 and 33 are thus conditioned but only AND circuit 31 passes a pulse to set associated latch 35. AND circuit 30 will not pass a pulse because it is not conditioned and AND circuit 33 will not pass a pulse because the output from inverter 18 is at a negative level at this time. As the card continues to move, the hole in column 2, which is adjacent to the hole in column 1 of row 9, uncovers associated sensing element 13 and the light level on transistor 16 increases to a maximum. Associated differentiator 17 produces a positive pulse in response to this change, and this pulse is applied to AND circuits 30 and 31 and to inverter 18. This time only AND circuit 30 is conditioned by an even column pulse, and it passes a pulse to set latch 36. AND circuit 32, which is also conditioned at this time, will not pass a pulse because the output of inverter 18 is at a negative level.

When the trailing edge of the hole in column 1 covers associated sensing element 14, the light level on associated transistor 16 falls and differentiator 17 develops a negative pulse. The negative pulse inhibits AND circuit 31 but is inverted by 18 and passed by AND circuit 33 to set latch 37. The set outputs of latches 35 and 37 activate AND circuit 39 which then provides an output signal indicative of the presence of an odd column data indication. Latches 35 and 37 are then reset when position 3 of counter 43 becomes active. Thereafter, and within the same sensing cycle, the trailing edge of the hole in column 2 covers sensing element 13 and the light level on associated transistor 16 falls to a minimum level. Associated differentiator 17 responsively produces a negative signal which is inverted by 18 and passed by AND circuit 32 to set latch 38. With latches 36 and 38 set, the input conditions to AND circuit 40 are satisfied and it passes an even column data signal. Latches 36 and 38 are then reset when position 4 of counter 43 becomes active.

It is thus seen that data indications in separate columns are sensed within a single sensing cycle by a common sensing device consisting of sensing elements 13 and 14 and associated phototransistor 16. While only two different data indication positions are shown as being sensed within the same sensing cycle, it should be understood that the number of positions sensed could be expanded. For example, there could be three or more sensing elements like 13 and 14 spaced to sense three or more positions. The emitter 24 would have to generate sampling pulses which are synchronized to the data indication positions and at a frequency to accommodate the three or more positions. Each position is always sampled twice, once at the leading portion and once at the trailing portion. A signal indicating that a valid data indication has been read is generated only when the data indication is present at both sampling times.

What is claimed is:
1. In a reading machine:
   means for sensing leading and trailing portions of sensible data indications on a document to provide two discrete signals for each data indication,
   generating means for generating a series of sampling pulses in synchronous relationship to the sensing of the leading and trailing portions of data indication positions on said document, and
   means responsive to the presence of said two discrete signals for a data indication and two associated sampling pulses for generating a data signal.
2. In a reading machine:
   means for sensing within the space of a single data indication position, the leading and trailing portions of at least two data indications located at two separate data indication positions on a document to provide two discrete pulses per data indication,
   sample pulse generating means for generating at least two series of sampling pulses, one of said series of pulses being in synchronous relationship to the sensing of the leading and trailing portions of one of said data indication positions and the other of said series of pulses being in synchronous relationship to the sensing of leading and trailing portions of the other of said data indication positions, and
   means responsive to the presence of two discrete signals for one data indication and two associated sampling pulses for generating a data signal.

3. The reading machine of claim 2 wherein said sensing means comprises:
   a light source positioned to direct light onto said two separate data indication positions,
   a light responsive device operable to provide output signals at different levels in accordance with the amount of light directed to impinge thereupon,
   means for conducting light from said two separate data indication positions to impinge upon said light responsive device whereby the same develops an ouptut signal at one level when light is from only one of said data indication positions, an output signal at a second level when light is from said two data indication positions and an output signal at a third level when light is absent from both of said data indication positions, and
   signal generating means responsive to changes in levels of said light responsive device for developing an output signal for each change in level.
4. The reading machine of claim 3 wherein said light source and said light responsive device are positioned on opposite sides of the document being sensed.
5. The reading machine of claim 3 wherein said light conducting means are fiber optic bundles.
6. The reading machine of claim 3 wherein said signal generating means is a differentiator.
7. The reading machine of claim 2 wherein said sample pulse generating means includes means for detecting the document in a particular position relative to said sensing means to start the generation of at least one of said two series of sampling pulses.

References Cited

UNITED STATES PATENTS

| | | | |
|---|---|---|---|
| 2,438,825 | 3/1948 | Roth | 250—208 |
| 2,967,664 | 1/1961 | Ress | 235—61.11 |
| 3,109,923 | 11/1963 | Welsh | 235—61.11 |
| 3,131,316 | 4/1964 | Glaz | 307—208 |

OTHER REFERENCES

Kline, IBM Technical Disclosure Bulletin, vol. 8, No. 9, February 1966.

Rohland, IBM Technical Disclosure Bulletin, vol. 7, No. 6, November 1964.

RALPH G. NILSON, *Primary Examiner.*

C. LEEDOM, *Assistant Examiner.*

U.S. Cl. X.R.

235—61.115